United States Patent
Best et al.

(10) Patent No.: US 6,824,808 B2
(45) Date of Patent: Nov. 30, 2004

(54) CHEWY CANDY ANALOGUE, METHOD OF MAKING, AND COMPOSITE ICE CONFECTIONS CONTAINING SAME

(75) Inventors: Eric Thomas Best, Dublin, OH (US); Ronald Paul Renati, Dublin, OH (US); Lawrence Allan Kibler, Marysville, OH (US); William Michael MacInnes, Lausanne (CH); Alois Raemy, La Tour-de-Peilz (CH)

(73) Assignee: Nestec S.A., Vevey (CH)

( * ) Notice: Subject to any disclaimer, the term of this patent is extended or adjusted under 35 U.S.C. 154(b) by 120 days.

(21) Appl. No.: 09/851,694

(22) Filed: May 9, 2001

(65) Prior Publication Data

US 2003/0035877 A1 Feb. 20, 2003

(51) Int. Cl.$^7$ ............................. A23G 9/00; A23G 3/00
(52) U.S. Cl. ..................... 426/565; 426/100; 426/101; 426/660; 426/572
(58) Field of Search .......................... 426/101, 95, 100, 426/572, 577, 565, 566, 567, 660

(56) References Cited

U.S. PATENT DOCUMENTS

| | | | |
|---|---|---|---|
| 4,234,611 A | 11/1980 | Kahn et al. | 426/321 |
| 4,311,716 A | 1/1982 | Launay | 426/275 |
| 4,387,109 A | 6/1983 | Kahn et al. | 426/321 |
| 4,401,681 A | 8/1983 | Dahle | 426/94 |
| 4,562,080 A | 12/1985 | Tenn | 426/94 |
| 4,853,236 A | 8/1989 | Langler | 426/102 |
| 5,011,704 A | 4/1991 | Smagula et al. | 426/660 |
| 5,718,931 A | 2/1998 | Walter et al. | 426/102 |
| 6,110,515 A | 8/2000 | Clechet et al. | 426/306 |

FOREIGN PATENT DOCUMENTS

| | | |
|---|---|---|
| AU | 4710089 | 7/1990 |
| EP | 0 176 237 A2 | 4/1986 |
| EP | 0 196 641 A2 | 10/1986 |
| FR | 2 578 718 A1 | 9/1986 |
| GB | 2 167 640 A | 6/1986 |
| GB | 2 263 615 A | 8/1993 |
| JP | 61173750 | 5/1986 |
| JP | 06319458 | 11/1994 |
| WO | WO 98/34499 | 8/1998 |
| WO | WO 98/58549 A1 | 12/1998 |
| WO | WO 02/01962 A2 | 1/2002 |

OTHER PUBLICATIONS

Kuntz, Lynn. Food Product Design: Ice Cream Inclusions. Jul. 1994, Design Elements. Weeks Publishing Co., pp. 10.*
R. Lees et al., *Sugary Confectionery and Chocolate Manufacture*, title page, pp. 348–352, and 357–359 (1973).
Graph showing calculation of ERH from sucrose equivalents in syrup phase. (date N.A.).

* cited by examiner

*Primary Examiner*—Keith Hendricks
(74) *Attorney, Agent, or Firm*—Winston & Strawn LLP

(57) ABSTRACT

A chewy candy analogue that is compatible with ice confectionery products, particularly in terms of the process, storage and consumption conditions of ice confectionery products, is manufactured to provide specific properties in respect of fluid rheology, heat conduction, insulation characteristics, setting rate and plastic deformation characteristic when processed in conjunction with regular ice confection products.

21 Claims, 1 Drawing Sheet

CHEWY CANDY ANALOGUE, METHOD OF MAKING, AND COMPOSITE ICE CONFECTIONS CONTAINING SAME

TECHNICAL FIELD

The present invention is directed to chewy candy analogues that are compatible with ice confectionery products, particularly in terms of the process, storage and consumption conditions of ice confectionery products. Also to methods of making such chewy candy analogues; to methods of combining such chewy candy analogues with ice confections; and to combination ice confectionery products that include such chewy candy analogues.

BACKGROUND OF THE INVENTION

Chewy candy or sugar confectionery products have been known throughout the ages and these satisfy both nutritional, for example energy, and hedonic needs, especially sweetness, of humans. They include items such as certain boiled sugar sweets, caramels, toffees, fudges, gums, jellies, licorice paste, cream paste, aerated confections such as marshmallow and nougat, various tablets, lozenges, chewing gums, fondants, marzipans, and the like, and combinations thereof.

A key feature of such materials is the need to be stable microbiologically, as well as physically, above freezing and particularly at ambient conditions, and this involves the inclusion of relatively high levels of sugar or sugars and other soluble solid ingredients for preservation reasons. High levels of such ingredients increases the hydrophilic properties, i.e., lowers the equilibrium relative humidity of such articles making them unsuitable for combination with ice confections.

Additionally, because of the high sugar(s) and other total soluble solids present in prior art chewy candy materials, they have a requirement to be processed and formed or shaped at high temperatures. Such high temperatures are generally anathema to routine ice confection processing and forming.

Further, such chewy candy articles are also normally stored and consumed at ambient conditions. This often results in different textures than if they had been stored with ice confections and consumed at normal ice confection consumption temperatures. If regular chewy candy articles are stored and consumed at the frozen temperatures of ice confections, they are unacceptably hard and gluey.

In these respects, prior art chewy candy or sugar confectionery is incompatible with ice confections and so there is a need for analogues of such products which are so compatible.

Ice confections are also well known. They include ice cream bulk products, novelties, i.e., bar and stick items, hard pack and soft serve, specialties, molded, decorated items and slices, desserts, puddings, frosted items, frappés, punches, bisques, lactose, mellorenes, non-dairy, frozen yogurts, popsicles, ice jollies, slushes, sorbets and others, and various combinations thereof. Ice confections may also contain optional ingredients such as fruit, nuts, chocolate, flour based products, etc. Within the general description of ice confections may also be included those products substantially similar in structure or function to ice confections, but which may not meet the specific legal definition(s) of ice confections in terms of their specific composition and/or process. Ice confectionery products include single serve items, such as on a stick, as well as those in a push up tube, or otherwise wrapped for easy consumption. Ice confectionery products may also be in the form of desserts, more or less elaborate for consumption at a table. Ice confections also serve to satisfy both nutritional, for example refreshment and hedonic needs, especially sweetness, of humans.

In order for ice confections to provide refreshment, they need to contain significant water, mostly as ice. Therefore, such products are not compatible with regular chewy candy or sugar confectionery, which is hydrophilic. There is a marked tendency for such combinations with regular candy to result in candy that absorbs water from the ice confection—with deleterious changes to both the candy and to the ice confection.

During the latter stages of the processing of ice confections, when combinations with other items such as chocolate, wafer, etc. are done, low temperatures are essential for reasons of shape, texture and microbiology. Such low temperatures are not appropriate for handling regular chewy candy or sugar confectionery because, at such temperatures the regular, chewy candy mass would not easily flow or otherwise be formable.

In order for ice confections to remain stable microbiologically as well as physically, they have to be at frozen conditions during their storage. They also are usually frozen throughout the vast majority of their consumption period to provide their cooling sensation and to maintain their physical shape and form. The ice confections will melt if stored at ambient conditions or if allowed to warm to ambient conditions prior to consumption. Therefore it is inevitable that chewy candy in a combination ice confection product will also be both stored and consumed at a lower temperature than is normal for regular chewy candy. This has significant consequences for textural characteristics, including bite and mouthfeel, and also for flavor release characteristics.

In these respects, high water content, cold processing, cold storage and cold consumption temperatures, ice confections are not readily modified to become compatible with the chewy candy or sugar confectionery of prior art.

U.S. Pat. No. 4,401,681 describes two-phase food products with reduced inter-phase moisture transfer. The technique is to incorporate dextrin and a hydrophilic polysaccharide gelling agent like pectin in amounts sufficient to form a barrier layer. It teaches a baking stage for the barrier layer to dehydrate and become impermeable. Such a baking stage is appropriate for dough-based goods such as cookies or pizzas, but clearly not for ice confections.

Further, U.S. Pat. No. 4,401,681 teaches preventing moisture transfer from a chewy fruit material into drier, baked, dough-based products. In the case of chewy candy and ice confection combinations, the challenge is to prevent the chewy candy, possibly fruit-based from attracting moisture into itself, moisture coming from the ice confection. In other words, the moisture gradient is in the opposite direction.

In U.S. Pat. No. 4,853,236, the achievement of a dual textured food piece containing a solid harder portion and a softer portion is taught. In this document, the softer phase could have up to a 0.2 difference in water activity from the harder phase. This was achieved by the use of oil-in-water emulsion in the soft portion, such that the emulsion was dimensionally stable at rest in being a thixotropic gel, which created a barrier between the portions.

The ice cream-types of ice confections are made from mixes which are of oil-in-water type, and the water ice types of ice confections do not contain significant levels of oil. In ice cream confections, the product is rapidly frozen, which converts fluid oils to solid fats, thus almost completely preventing oil mobility towards, and oil deposition at product interfaces. Therefore, the teaching of U.S. Pat. No. 4,853,236 is inapplicable to composite food pieces in which one of the pieces is an ice confection, which is the softer phase. This is recognized in U.S. Pat. No. 4,853,236 where benefits such as long term, unrefrigerated, shelf stability are described.

In WO 98/34499, the preparation of sheared gels containing agar, guar and locust bean gum is described in the preparation of ice cream, mousse and low fat spreads. Such a microparticulated gelling agent mixture led to claims to simulate the use of gelatin, such that the products had reduced syneresis or weeping of fluids like water. This was believed to be caused by a postulated mechanism of gel recovery. Syneresis inhibition would seem a possible aid to inhibiting moisture transfer from ice confections to chewy candy items.

There is no combination, however, of the ice cream with chewy candy. It is in the combination that the chewy candy exacerbates the moisture transfer by attracting water from the ice confectionery. Therefore, modifying ice cream according the teaching of WO 98/34499 does not prevent moisture migration in a composite product as contemplated here.

In U.S. Pat. No. 5,718,931, simulated fruit pieces having moisture transfer resistance are described. In this system, the fruit pieces contain at least 45% humectant to inhibit their loss of moisture, and have a barrier coating comprising a surround of dried fruit particles and a gelatin-based gel layer. The aim of this patent is to create a water activity in the fruit pieces as low as 0.3 to 0.5 to inhibit moisture transfer from the chewy fruit materials to dry materials such as bran flakes in a packaged breakfast cereal.

The cereal of this patent normally attracts moisture from the chewy fruit analogue particles. In the case of chewy candy and ice confection combinations, however, Applicants note that the challenge is to prevent the chewy candy from attracting moisture into itself, moisture coming from the ice confection. In other words, the moisture gradient is in the opposite direction.

Despite the difficulties of achieving a chewy candy/ice confection combination, the human needs for both energy and for refreshment are not mutually exclusive—especially on days of hot weather. For added convenience, for variety and for hedonic delight, it is therefore desirable to have available single products that contain combinations of chewy candy and ice confections.

Thus, there remains a need for analogues of such chewy candy or sugar confectionery materials that are compatible with ice confections. A need exists for chewy candy that can be processed and stored in combination with ice confections. Also, there is a need for chewy candy that can be consumed in combination with ice confections at appropriate temperatures, without the chewy candy losing its desirable characteristics. The present invention teaches how to make and how to use chewy candy analogues, in combination with ice confections, without the aforementioned disadvantages.

SUMMARY OF THE INVENTION

The invention relates to a chewy candy or sugar confectionery analogue or to a food product containing the same. The analogue advantageously has an equilibrium relative humidity of at least about 70% and a chewy transition temperature from about −15° C. to 0° C. Thus, the analogue is in a glassy state at normal cold storage and distribution temperatures for ice confectioneries but becomes chewy in the mouth when eaten cold, thus simulating the texture of regular chewy candy eaten at ambient temperature.

Suitable analogues include at least one ingredient of boiled sugar sweets, caramels, toffees, fudges, gums, jellies, licorice paste, cream paste, aerated confections such as marshmallow and nougat, chewing gums, fondants, marzipans. In a preferred embodiment, the chewy transition temperature of the analogue is from about −12° C. to −3° C., and the equilibrium relative humidity is at least about 75%.

The invention also relates to a process for preparing the product, wherein the ingredients are dispersed with water, cooked, and then diluted with an aqueous phase under sufficient pasteurization to achieve a fluid pasteurized mass having the equilibrium relative humidity of at least about 70%.

Another aspect of the invention relates to a process for preparing a composite frozen confectionery product by combining the product with an ice confection, which includes rapidly cooling a fluid chewy candy mass by first contacting the mass with an ice confection having a temperature of less than about −15° C. to form a combination, and conditioning the combination in a medium having a temperature of less than −15° C. until the chewy candy mass has undergone a glass transition.

The invention further relates to a composite frozen confectionery product including a candy or sugar confectionery analogue as described above, and an ice confection. In one embodiment, the ice confection is disposed on a stick or in a push-up tube. In another embodiment, the ice confection includes at least one of ice cream, pudding, yogurt, popsicle, slush, or sorbet. In yet another embodiment, the ice confection further includes at least one of chocolate, flour-based products, or a plurality of fruit or nuts.

It is preferred that the analogue is predominantly glass, i.e., has less than half of its structure in crystalline form. In one preferred embodiment, the analogue is substantially free of crystalline structure. i.e., less than 5% of crystalline structure. In another preferred embodiment, the analogue is completely free of crystalline structure, i.e., is a complete glass.

In one embodiment, the analogue includes at least one coloring agent. In another embodiment, the analogue includes at least one sugar, palm oil, and water. In a preferred embodiment, the at least one sugar includes sucrose and corn syrup and the analogue further includes mango pulp, pectin and citric acid. In a preferred embodiment, the total sugar is present in an amount of about 60 to 90 parts, and the palm oil is present in an amount of about 2 to 8 parts. In yet another embodiment, the mango pulp is present in an amount of about 5 to 15 parts, the pectin is present in an amount of about 0.2 to 1.2 parts, and the citric acid is present in an amount of about 0.05 to 0.7 parts.

BRIEF DESCRIPTION OF THE DRAWINGS

Further features and advantages of the invention can be ascertained from the following detailed description that is provided in connection with the drawing(s) described below.

DETAILED DESCRIPTION OF THE PREFERRED EMBODIMENTS

Figure 1:
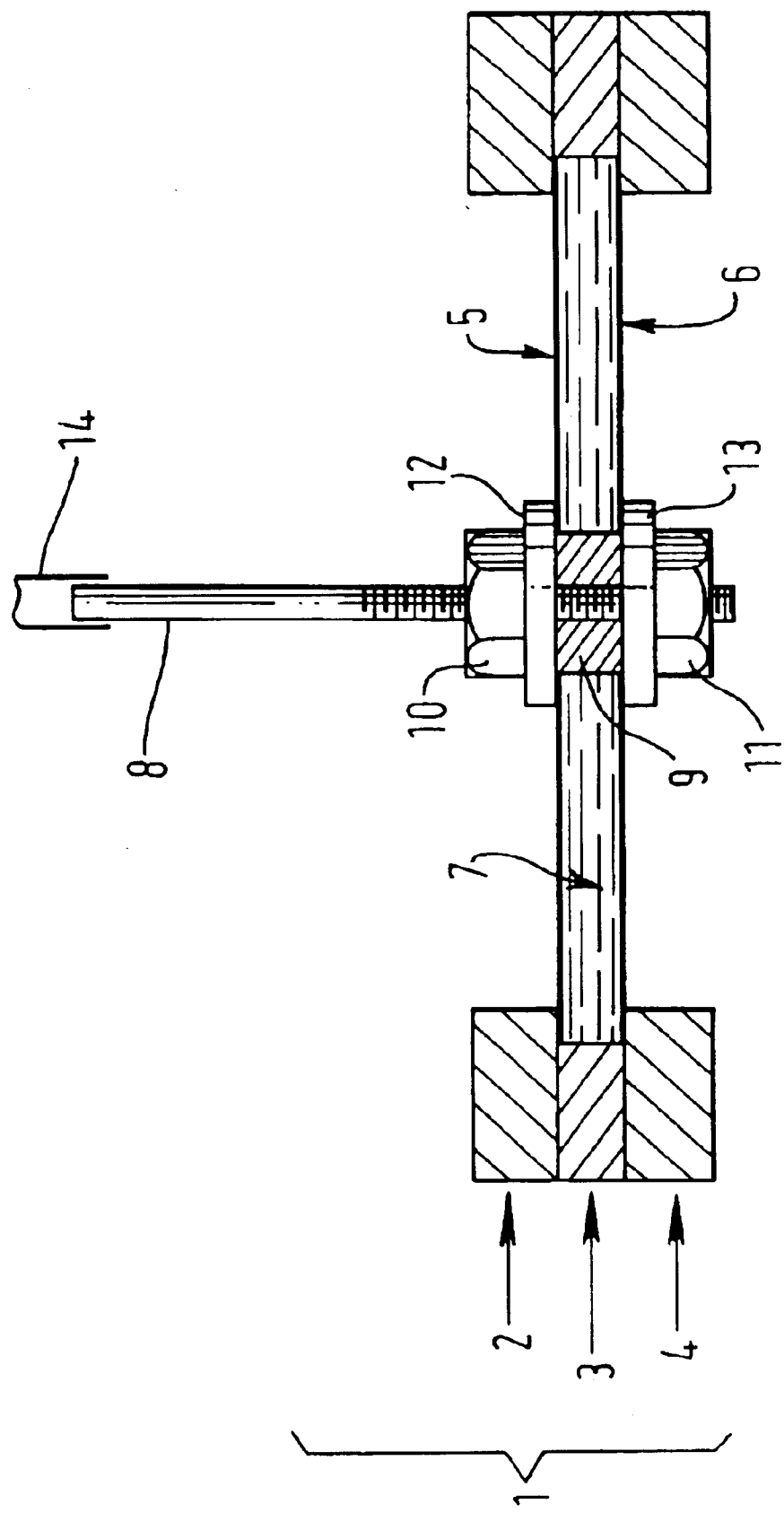
FIG. 1 schematically illustrates a DMTA disc-bending sample holder for testing products prepared according to the invention.

The present invention advantageously provides new ways to formulate and to process novel analogues of chewy candy masses such that they become compatible with ice confectionery products, particularly in terms of the regular process, storage, and consumption conditions of ice confectionery products. Also, the present invention provides methods of combining such chewy candy analogues with ice confections; and the resultant products.

The invention thus concerns a chewy candy or sugar confectionery analogue having: a) an equilibrium relative humidity of greater than 70%, and b) a chewy transition temperature of about −15° C. to 0° C., which is in a glassy state during cold storage at the normal storage and distribution temperature for ice confectionery but which becomes chewy in the mouth when eaten cold, thus simulating the texture of regular chewy candy when eaten at ambient temperature.

The term "cold storage at the normal storage and distribution temperature for ice confectionery" means those temperatures that are utilized for storage of ice confectioneries. Generally, these temperatures would be below 0° C. and typically would be between −10° C. and −40° C.

The chewy candy or sugar confectionery analogues of the present invention have specific properties in respect to their fluid rheology, heat conduction, insulation characteristic, setting rate and plastic deformation characteristic when processed in conjunction with regular ice confection products. The present chewy candy or sugar confectionery analogue have novel equilibrium relative humidity, chewy transition, and textural stability characteristics when in combination with regular ice confections during such cold storage and distribution.

The invention also concerns regular ice confection and chewy candy or sugar confectionery analogue combination products. These products have novel changes of character between their initial bite, and during their chewing up to swallowing.

Chewy candy or sugar confectionery products include certain boiled sugar sweets, caramels, toffees, fudges, gums, jellies, licorice paste, cream paste, aerated confections such as marshmallow and nougat, various tablets, lozenges, chewing gums, fondants, marzipans, and the like, and combinations thereof. A variety of ice confections suitable for use according to the invention are also well known. They include ice cream bulk products, novelties, i.e., bar and stick items, hard pack and soft serve, specialties, molded, decorated items and slices, desserts, puddings, frosted items, frappés, punches, bisques, lactos, mellorenes, non-dairy, frozen yogurts, popsicles, ice lollies, slushes, sorbets and others, and various combinations thereof. Ice confections may also contain optional ingredients such as fruit, nuts, chocolate, flour based products, etc. Within the general description of ice confections may also be included those products substantially similar in structure or function to ice confections, but which may not meet the specific legal definition(s) of ice confections in terms of their specific composition and/or process. Ice confectionery products include single serve items, such as on a stick, as well as those in a push up tube, or otherwise wrapped for easy consumption. Ice confectionery products may also be in the form of desserts, more or less elaborate for consumption at a table. Ice confections also serve to satisfy both nutritional, for example refreshment and hedonic needs, especially sweetness, of humans.

The present invention includes equilibrium relative humidity (ERH) and chewy transition temperature, which is a special form of a glass transition temperature (or Tg) measured at a high frequency of oscillatory deformation.

The first feature provides chewy candy or sugar confectionery analogues having an elevated equilibrium relative humidity (ERH) to inhibit or avoid moisture transfer from ice confections that are touching the candy analogues during the preparation, storage and consumption of products that are combinations thereof. ERH is not directly related to moisture content, but is influenced by the specific composition of the different soluble solids in the syrup phase of the candy analogue, as is known by those of ordinary skill in the art.

There are a number of methods for the determination of the ERH of candy, including for example, the method described by Norrish, R. S., (1964), Confectionery Production, (10), 769, 771 and 808. ERH of a candy may be described as the relative humidity (RH) of the air, at which the candy does not gain or lose moisture.

When two food components (in this case the candy analogue and the ice confection) have similar equilibrium relative humidities (ERHs), the driving force for the movement of moisture between the articles is minimized. This is considered a direct moisture transfer route and if this were the only route of moisture transfer then direct barrier materials might help. There is also, however, an indirect moisture transfer route.

The absolute moisture content (humidity) in the atmosphere surrounding an ice confection during its storage at around −30° C. is relatively low. But, this does not mean that such atmosphere has a low relative humidity (RH). RH is the amount of moisture in the air, expressed as a percentage of the maximum amount of moisture that the air can hold at the same temperature (or when the dew point is that temperature).

To measure relative humidity below freezing point with a wet and dry bulb psychrometer, it is necessary to paint the wet bulb with distilled water and wait for a steady ice-bulb temperature to be reached. If the wet bulb gets coated with super-cooled water, freezing may be induced by touching the wet bulb with a piece of ice (or hoar frost). Upon freezing, the wet bulb will first rise to 0° C. and, after freezing is completed, will gradually fall to give a true ice bulb reading. Sufficient time (30 minutes) should be allowed to attain a steady temperature before consulting hygrometric tables to determine the correct RH of the air.

The ice confections of the invention, despite their low moisture vapor pressure, will reach equilibrium with air (inside the wrapped package) during storage. This air is very close to its dew point (point of maximum moisture saturation), because the air is at the same low temperature as the ice confection, and the air therefore has very little moisture holding capacity.

During the fluctuations of temperature that occur during product storage and distribution, moisture is both vaporized from the ice confection into this air and then condensed out of this air in a cyclic manner. The saturated vapor pressure (SVP) over ice is well below 1 millibar at the normal (−30° C.) storage conditions of ice confections (SVP equals 1 mbar at −21° C.). This makes seemingly minor changes in the moisture content of the air exceedingly critical.

In the case of a combination product containing both a regular chewy candy and an ice confection, there is a natural partition of the condensing moisture vapors. The moisture vapors condense to a higher extent upon the product with the lowest ERH (such as the regular chewy candy).

Importantly, the rate of absorption of the moisture is also a reaction that proceeds slowly at the low temperatures of cold storage. Therefore, any sudden changes in temperature can induce dew at a faster rate than can be accommodated by a chewy candy's moisture absorption rate. When this occurs there is a visual "sweating" with a resultant dissolving of water-soluble materials at the surface of the chewy candy. This undesirable situation leads to further problems in terms of appearance, color washing and growth of surface sugar crystals.

This "indirect" moisture transfer route has been discovered to be of major significance. For this reason, the mere provision of a moisture barrier layer between the chewy candy and the ice confection is ineffective. The alternative of totally wrapping the chewy candy in a moisture barrier, such as a fat system like chocolate, is a little more effective—but this can distract from both the visual appeal and the textural sensations upon product consumption.

Another consideration is that moisture barriers frequently become brittle at the cold storage temperatures of ice confections, and are subject to cracking during the expansions/contractions induced by any unplanned thermal fluctuations. The integrity of barriers therefore cannot always be guaranteed.

It has been discovered that chewy candy analogues for the purpose of this invention may be formulated with their ERH substantially elevated. The ERH of regular chewy candy normally lies in the region of 45% to 65% depending upon type and specific recipe. For a table of ERH for different chewy candy type, see Lees R., and Jackson, E. B., (1973), "Sugar Confectionery and Chocolate Manufacture", Leonard Hill Books, 8.

In particular, the chewy candy product analogues of the present invention are provided with an elevation to at least about 70% in ERH, and preferably at least about 75% in ERH. Such an increase in ERH is a vital first step in minimizing the problems of moisture transfer when combining chewy candy and ice cream. To achieve such a high ERH, the formulation of the chewy candy analogue is modified both by recipe and by process.

The ERH of the recipe is inversely proportional to the molecular concentration of the dissolved components in the syrup phase. A reduction in molecular concentration will increase the ERH. Therefore, any relatively low molecular weight elements such as salts and polyols (glycerol, sorbitol, etc.) should be reduced in their quantity. The grade of any corn syrup can also preferably have its dextrose equivalent (DE) reduced to take advantage of higher molecular weights. The low DE corn syrup solids will also introduce a beneficial skin generation characteristic. High molecular weight materials such as hydrocolloids may replace part of the regular solid contents that are lower in molecular weight. Similarly, the generation of polymers in situ during processing (such as the caramelizing of simple sugars) can be advantageous.

In terms of process, the cooking temperatures should be reduced to minimize dehydration. Alternatively, lost moisture should be re-incorporated after cooking should high temperatures be desirable for other reasons, such as protein modification.

There are other benefits in having the chewy candy analogue at a higher ERH. The viscosity of the hot mass is lower, which enhances convection type heat transfers thus improving the efficiency of cooking. Further, the lower viscosity mass has improved flow properties for processing without having to resort to the elevated temperatures of conventional chewy candy handling.

Such an increase in ERH would clearly be detrimental to the microbiological aspects of the ambient storage and distribution of regular chewy candy. This is not a concern, however, in the deep freeze cold storage and distribution of the pasteurized chewy candy analogues of the present invention.

Such an increase in ERH would also significantly and detrimentally soften prior art chewy candy in terms of its textural characteristics at ambient conditions. This would tend to result in undesirable cold flow problems (a slow deformation of shape) and excessive wrapper adhesion of such conventional chewy candy.

Surprisingly, the chewy candy analogue products of the present invention do not have excessive softness. It will be noted that the chewy candy analogues of the present invention would differ in textural characteristics compared to conventional chewy candy if both were evaluated at ambient temperature. An important consideration in the present invention, however, is that it is the textural characteristics of the chewy candy analogues at their temperature when combined with ice confections that are relevant. It is the texture generated, when eaten cold, that should simulate the texture of regular chewy candy when eaten at ambient temperature.

In part, the reduction in softness of the present invention is achieved because the chewy candy analogues of the present invention are stored, distributed and consumed at much lower temperatures.

Another preferred feature of these chewy candy analogues according to the invention is to create a different chewy transition temperature point for the chewy candy analogues versus regular chewy candy. The desired chewy transition temperature for the chewy candy analogues of the present invention is from about −15° C. to 0° C., and preferably from about −12° C. and −3° C.

A chewy transition is a special form of a glass transition temperature that is a change in the structural state of the matter from a glassy (non-crystalline) solid that fractures upon deformation, to a more flexible solid structure that may be deformed without fracture resulting.

In the apparently solid glass, the random molecular structure of a liquid sol remains, yet the cross-link density (particularly with polymeric molecules) prevents large-scale molecular motion and so leads to the properties of brittleness, stiffness and rigidity.

A glassy solid may be differentiated from a crystalline solid, and a glassy solid has benefits over a crystalline solid in this invention. In contrast to a glassy solid, a crystal solid exhibits specific X-ray diffraction or other light scattering patterns owing to the regular repeating pattern of its molecules. A glass does not exhibit this property.

Glass transition points in general may be measured by a variety of methods, one example being the use of differential scanning calorimetry (DSC). Other techniques may include determining the temperature at which there is a loss of dielectric molecular motion, or by monitoring the changes in loss or elastic moduli (G double prime or G prime) during a temperature sweep in oscillatory or oscillation type rheometry. Differential scanning calorimetry (DSC) measures one type of glass transition point ($T_g$). For DSC, the sample is very cold and warmed slowly until the very first molecular movement starts to occur. This event exhibits itself as a small but measurable change in enthalpy.

There are other "glassy types" of transitions that occur at other temperatures. The transition temperature at which a glassy material converts to a deformable chewy solid is related to the frequency of the applied deformation. To explain this aspect one may consider a glass window. One knows that even a glass window in an ancient cathedral (say 500 years old) will be thicker at the bottom that at the top.

Such cathedral glass has exhibited deformation (in that it flowed under gravity)—because sufficient time passed for the movement (or in other words it experienced a very low frequency of deformation). Under a larger frequency of deformation, the cathedral glass would have behaved as a fracturable solid and would have shattered.

During the process of eating foods, the frequency of deformation is relatively high compared to the frequency of deformation caused by gravity sag in a cathedral window. Therefore, the chewy candy or sugar confectionery of this invention tends to exhibit all the physical characteristics of being glass when below the chewy transition temperature, despite such materials having their chewy glass transition temperature above their DSC glass transition temperature.

It was discovered that the relevant temperature of this specific glass transition—corresponding to the appropriate sensory change experienced upon eating (the change from an apparent glassy solid to a mobile chewy mass)—could be accurately measured by the technique of Dynamic Mechanical Thermal Analysis (DMTA). An example method for the determination of this relevant and specific glass transition (termed the "chewy transition" temperature) by the technique of DMTA is supplied herein.

Considering and modeling certain physico-chemical properties of ingredients enables a prediction of the trending effects of the different recipe components upon this specific chewy type of glass transition point. Such properties include the connectivity basis of each functional group, likely molecular mechanical volume changes with temperature, and a general consideration of aspects such as the ease of the backbone rotation of polymers etc.

To achieve the desired chewy transition point, the chewy candy analogues are first prepared into a viscous solution state, which may include a degree of melting of some of the components, and which may also include some undissolved ingredients in suspension. The viscosity is achieved either by water content reduction, or by the addition of water binding elements such as hydrocolloids, especially where water content reduction alone would lower the ERH below the critical values at which the invention performs.

While in such a state of solution, albeit viscous, the molecules of the solution are disordered. When this viscous solution is contacted with and cooled with the frozen ice confection, it rapidly adopts a solid nature. During this event, the viscosity inhibits or even prevents the otherwise natural (based upon lowest energy interactions between the molecules) re-arrangement of the molecules into the form of a crystal lattice. The resultant solid-like structure is therefore a glass. This glass maintains a primarily random orientation of its molecules, yet is without noticeable flow properties. Without wishing to be bound by theory, the nature and concentration of the solutes, and the rapid increase in viscosity (to greater than about $10^{12}$ Pa*s at the temperature of transition) are believed to be responsible for the maintenance of the amorphous nature of the solid-like glass.

It was discovered that achieving this particular glass transition could be achieved by contacting the chewy candy with an ice confection colder than about −15° C., and then cooling the combination product in a medium having a temperature below about −15° C. The so-induced glass transition serves several purposes and gives many benefits as noted herein.

The relatively high latent heat of fusion that would be released upon crystallization of the chewy candy analogue is inhibited or avoided. Therefore, the effect of such a high latent heat upon the ice confection is also inhibited or avoided.

The thermal conductance of a glass is relatively low compared to a crystalline structures. Therefore, upon contacting the chewy candy analogue with the ice confection, an immediate insulation layer is formed and the vast majority of the heat loss is into the cooling chamber, not into the ice confection. In one embodiment of the invention, a highly viscous liquid chewy candy analogue at 200° C. was contacted with ice cream at −25° C., and the combination then cooled. A glass instantly formed at the interface, yet the ice cream surface advantageously did not visibly melt. The glass has a high clarity, providing the combination products significant visual appeal, which is desirable in the end products available to consumers.

The glass may contain colors or dyes that are substantially uniformly or completely uniformly distributed. In comparison, crystals are generally individually of high purity and upon crystallization from solution any prior incorporated color becomes concentrated and located at the crystal surfaces.

The glass tends to maintain its shape and solidity while in contact with the ice confection (until it is consumed and its glass transition temperature is then reached).

The low storage temperatures normal to ice confections inhibit the potential for graining or crystallization of the glass (to reach a lower energy state) during storage. The low temperatures inhibit or avoid achievement of the required activation energy of such a reaction, and additionally inhibit or avoid reaching reaction rates. This avoids the need to utilize low storage RH values to inhibit graining. This further permits the chewy candy analogues of the present invention to be in contact with ice confections throughout storage and distribution.

At the start of consumption, the glass tends to be brittle and so easily fractures, which gives a desirable clean bite to the combination of the chewy candy analogue and the ice confection. Once bitten, the glass then transforms in the mouth. This is only partly because of elevated temperature. Another effect of solubility comes into play. The random orientation of the molecules in a glass causes them to be much more easily penetrated by moisture and hence more rapidly soluble than crystals would be upon consumption. Therefore, dilution rapidly changes the concentration of the glass and facilitates consumption of the combination product.

Dilution may be by saliva, the generation of which can in part be promoted by the incorporation of components such as acids or salts into the formulation of the chewy candy analogue. Additionally, dilution occurs by moisture released from the melting of the water content in the ice confection, which is being simultaneously consumed.

The glass transition point is lowered as the concentration of the material is lowered. Therefore, the original glass of the chewy candy analogue rapidly transforms into a new state which is herein referred to as the "rubbery phase." Once in the rubbery phase, the chewy candy analogue loses its glassy nature and the classic chewy nature of a regular chewy candy is restored.

While in either the glassy state or the rubber phase, the random orientation of the molecules of the chewy candy analogue permits intermingling and affinity of flavor compounds. This desirably results in a pleasant and prolonged release of flavor during product consumption.

In contrast, had the chewy candy analogue been present in a crystalline state, the purity of the individual crystals would have concentrated the flavor elements at the crystal surface. Consumption of a crystalline product would therefore have resulted in a rapid and perhaps overly strong initial flavor release associated with an undesirable and rapid flavor fade that consumers dislike.

The combined product of the invention may be in the form of an ice cream stick bar, which can be extruded or molded.

Such a bar can be coated, on part or on its whole surface, with one or more layers of a chewy candy analogue of the invention. Coating may, for example, be made by enrobing or dipping. It can be accomplished by simple or multiple applications or layers of the analogue. The combined ice cream stick bar may also comprise a core of chewy candy analogue surrounded by an ice cream mass and can be made by the "shell and core" method known to those of ordinary skill in the art. Indeed, the chewy candy analogue can be used to form a plurality of inclusions in the ice confectionery, alternatively or in addition to either of the two above embodiments. In one embodiment, the chewy candy analogue may be present as one or more inclusions in a mass of ice cream bulk or cup.

The combined product of the invention may be in the form of a morsel or ice cream bonbon coated or enrobed with a chewy candy analogue.

It may be a dessert, e.g., in the form of a dome or cake that contains the chewy candy analogue as a coating, as a core, or as inclusions.

The chewy candy analogue may further be applied in successive layers or patterns between ice cream layers, e.g., in a layered cake or log.

The combined product may further be coated or enrobed or otherwise combined with a fat-based coating, e.g., a chocolate or couverture coating.

Method of Determining Chewy Transition Point by DMTA Measurement Experimental Details The viscoelastic properties are preferably measured by oscillatory bending using the Polymer Labs DMTA (distributed by Rheometrics Scientific International, Piscataway N.J. 08854, USA). A disc-bending sample holder is used to contain the samples during the measurements. The DMTA disc-bending sample holder is shown schematically in FIG. 1. The sample holder 1 consists of three aluminum rings 2, 3 and 4, separated by two plastic discs 5 and 6 (PET or KAPTON, 0.07 mm thick). The middle ring 3 (50×38 mm in diameter) of a thickness of 2 mm defines the sample 7 thickness for the measurements. This can be increased if samples are too soft. Even liquid samples are held in place by the two plastic discs 5 and 6 during the temperature scans.

The four legs (not shown) of the polymer Labs DMTA pass through the rings. The rings are rigidly attached to these legs by nuts above and below the rings (not shown), thus clamping the plastic discs 5 and 6 tightly between the rings, and preventing leakage (a small amount of vacuum grease can be used as necessary).

The DMTA oscillatory force is applied to the centre of the plastic disc-sample "sandwich" via an M4 bolt 8 which passes through the plastic sheets which are separated there by an aluminium 6 mm diameter bushing 9 (to maintain a 2 mm sample thickness). Nuts 10, 11 tightened on washers 12 above and 13 below the plastic discs 5, 6 give rigid coupling to the DMTA drive shaft 14 (O-rings cannot be used here, as they have an observable glass transition in the range of −50° C.). The DMTA head is positioned with the drive shaft 14 aligned vertically. The sample holder is below the head, in the horizontal plane, to avoid gravitational effects during freezing, and to make quench cooling by immersion in liquid nitrogen possible.

It is important to note that the plastic discs 5 and 6 permit free movement of the sample centre of the order of + or −2 mm. This is much greater than the deflection applied to the sample centre during the measurements (±0.032 mm). This corresponds to a strain of approximately 0.2%, which is well within the linear viscoelastic range, where the viscoelastic moduli have no strain dependence.

Two thermocouples (K type, not shown) are inserted, after the loading of samples, for in-sample temperature measurement during the temperature scan. A third thermocouple (not shown) in the rings is used to create a Differential Thermal Analysis (DTA) signal, for confirmation of glass transitions.

Sample Loading Procedure for the Oscillatory Disc-bending Measurements

The 2 mm thick samples were removed from storage at −20° C., allowed to warm to about room temperature (20 minutes) and then were spread over the bottom plastic disc 6, inside the center ring 3. The spacer bushing 9 was centered over the hole in the middle of the disc, and the top plastic disc 5 was positioned and pressed over the sample 7 and ring. Afterwards, the top clamping ring 2 was set in place, and the complete sample "sandwich" was held together by two screws. After insertion of the center bolt 8, the entire system was bolted to the legs of the DMTA. The nuts 10, 11 on the center bolt 8 were tightened onto the spacer bushing 9 and the center bolt 8 was clamped to the DMTA drive shaft 14. Before clamping, it is important to ensure that the center bolt 8 can move up and down freely.

Measurement and Analysis

The viscoelastic moduli were measured in bending using a deflection of ±32 microns, which corresponds to a strain of about 0.2%, which is low enough for the moduli to be measured in the linear viscoelastic range. The temperature of the chewy glass transition (onset of chewiness) is determined from the loss modulus peak temperature at a frequency of 100 Hz. (this temperature agrees with the sensory determination of onset of chewiness measured by surface infrared thermometer). At this chewy glass transition temperature the sample material functions as a "shock absorber" under the imposed deformation frequency.

The frequency of measurement may be multiplexed between other Hz values, while the temperature of the sample was being scanned continuously. Temperature scans were performed in cooling mode at 0.5° C./minute down to −80° C. and in heating mode at 0.5° C./min. up to 40° C. The data was logged using Lotus 1-2-3 Measure program and analyzed using Lotus 1-2-3 and Excel. The DMTA disc bending technique gives a well-defined loss modulus peak temperature owing to the presence of the plastic discs that prevent the sample from flowing away when the transition temperature has been reached. A theoretical experimental artifact of measuring the rigidity of the plastic discs was not found to affect the determination of the onset of chewiness temperature. This is because the plastic disc rigidity only starts to become a feature when the sample material falls below a viscosity of $10^3$ Pa*s, (which only occurs well after the chewy transition).

EXAMPLES

The invention is further illustrated, but not limited, in the following working examples, where all percentages and parts are by weight.

Example 1

Glass-state Product Prepared According to the Invention

The following was prepared according to the invention as described below.

| Ingredients (by part) | |
|---|---|
| Sucrose | 63 |
| Corn syrup, 36 DE | 16 |
| Mango Pulp | 10 |

-continued

| Ingredients (by part) | |
|---|---|
| Hydrogenated Palm Kernel Oil | 5 |
| Pectin, 35 DM* | 0.7 |
| Citric Acid | 0.3 |
| Water | 16 |
| Colors | q.s. |
| Flavors | q.s. |
| Total | 111** |

*DM: Degree of Methylation
**water was added after the color, flavor and acid addition to bring the total back to 100 parts.

90% of the total quantity of sucrose was dissolved in the water and brought to the boil. Corn syrup and hydrogenated palm kernel oil were added. The pectin was dry dispersed in 10% of the total quantity of sucrose and added using high speed agitation. The mix was heated rapidly to 124° C. within 8 min. and then the mixture was rapidly cooled to 93° C. within 10 min. Fruit pulp, acid, colors and flavors were added. The mix was adjusted back to 100 parts by water addition.

Temperature was maintained by use of a Dewar flask (vacuum insulated flask). Equilibrium relative humidity (ERH) was determined as 79% by using a water activity meter. Chewy transition temperature was determined as −9° C. by stated DMTA technique. The fluid chewy candy analogue was contacted with ice cream mass at −25° C. by applying surface stripes to the ice cream (it was a classical ice cream of 10% fat content and 60% overrun).

The combination product was cooled in a blast tunnel using air at −40° C. until the external surface temperature of the product had reached −20° C. as determined by infrared thermometer. The product was stored at −30° C. as is normal for ice confections.

Upon consumption of the product, the glass and ice cream bit cleanly and the glass then rapidly converted to a chewy candy mass in the mouth.

Example 2

Stick Ice Cream Product According to the Invention

A chewy candy analogue was prepared as in Example 1. The fluid chewy candy analogue was contacted with ice cream (on a stick) by dipping the ice cream (at −20° C.) into an insulated reservoir containing the analogue to achieve a full surface coating. The combination product was cooled by placing in a liquid nitrogen medium, until the external surface temperature had reached −20° C. The product was then stored at −30° C. Upon consumption, the product had the same characteristics as that of example 1.

Example 3

Excess Solid Product According to the Invention

The following was prepared according to the invention.

| Ingredient | % |
|---|---|
| Corn Syrup, 36 DE | 17 |
| Gelatine solution (20% of 150 Bloom) | 9 |
| Hydrogenated Palm Kernel Oil | 4 |
| Powder Sucrose | 70 |

-continued

| Ingredient | % |
|---|---|
| Colors | q.s. |
| Flavors | q.s. |
| Total | 100 |

The corn syrup was heated to 60° C. Hydrogenated palm kernel oil was added to the corn syrup, whereupon it melted and was dispersed. The gelatin solution was added and sucrose was added slowly with good agitation to avoid formation of lumps. The resultant mass was adjusted to an ERH (in the syrup phase) of 80%. The ERH was directly controlled by the composition of the syrup phase. The sucrose equivalent content of the syrup phase may be calculated from the total yield of the recipe according to the modified Grover's equation—Lees R., Jackson, E. B. (1973), "Sugar Confectionery & Chocolate Manufacture", Leonard Hill Books, 349. The syrup and crystal phase may also be calculated according to Hinton's equation—Hinton, C. L., (1958) "Manufacturing Confectioner", June—after determining the total dissolved solids of the syrup phase of the sample by, e.g., refractometer.

Only minor adjustment was necessary as a standardization step.

The product was not pasteurized.

The chewy transition temperature was determined to be at −8° C. initially, and did not change after 4 weeks storage at −30° C.

The fluid paste-like candy analogue mass was contacted as 1 mm thick layer with ice cream (−20° C.) and the combination product was dipped in liquid nitrogen until the external surface temperature reached −20° C. The chewy candy analogue formed a glass interspersed with fine fondant-like sugar crystals. The combination product was stored at −30° C.

Upon consumption of the combination product, the candy mass moistened rapidly in the mouth and became chewy within 1–2 s.

This example demonstrated that even an excess of solids (a potential seed for crystallization) did not prevent a partial glass from forming when the cooling rate was sufficiently rapid.

Comparative Example 1

An ice cream on a stick (as per example 2) was manually wrapped in fruit leather of the name "Fruit by the Foot," General Mills Inc., Minneapolis, Minn. 55440, USA, a commercial product that is sensorially chewy when stored and consumed under ambient conditions. The combination product was stored at −30° C. as is typical for ice cream. ERH and chewy transition were:

ERH 57%

Chewy transition +10° C.

Upon attempting consumption, the now tough, conventional candy was not easily bitten, but rather slid from the ice cream in one piece. A knife was therefore used to prepare a mouth-sized portion of the combination product. Upon consumption the hard candy proved excessively adhesive to the teeth. The eating was laborious and the ice cream had completely melted 4 min. before the candy had achieved a desirable chewy texture.

Comparative Example 2

A regular pectin jelly candy was prepared according to the recipe as described in "Confectionery Products with Genu Pectins", 1986, A/S KØBENHAVNS PECTINFABRIK, The Copenhagen Pectin Factory, DK 4623, Little Skensved, Denmark, 7–10. This recipe is well known to give acceptable products for consumption—when as individual chewy candy items at ambient temperature. ERH and chewy transition were:

ERH 61%

Chewy transition +9° C.

When the pectin recipe (at 90° C.) was contacted with the ice cream (at –0° C.) by various means, adhesion was poor. Melting of the surface of the ice cream also occurred. During cold storage (–30° C.), the chewy candy portion was observed to sweat and to bleed color. During consumption, the chewy candy was excessively hard and the ice cream had melted three minutes before the candy portion had become sufficiently pliable.

It is to be understood that the invention is not to be limited to the exact configuration as illustrated and described herein. For example, it should be apparent that a variety of materials would be suitable for use in the composition or method of making the golf balls according to the Detailed Description of the invention. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A chewy candy or sugar confectionery analogue having the following properties:
   an equilibrium relative humidity of at least about 70%; and
   a chewy transition temperature from about –15° C. to 0° C., such that the analogue is in a predominantly glassy state at normal cold storage and distribution temperatures for ice confectioneries but becomes chewy in the mouth when eaten cold, thus simulating the texture of corresponding chewy candy eaten at ambient temperature.

2. The analogue of claim 1 wherein the chewy transition temperature is from about –12° C. to –3° C.

3. The analogue of claim 1 wherein the equilibrium relative humidity is at least about 75%.

4. The analogue of claim 1, comprising at least one ingredient of boiled sugar sweets, gums, jellies, licorice paste, cream paste, aerated confections, chewing gums, or marzipans.

5. The analogue of claim 4, wherein the ingredient(s) is/are dispersed with water, cooked, and then diluted with an aqueous phase under sufficient pasteurization to achieve a fluid pasteurized mass having the equilibrium relative humidity of at least about 70%.

6. A process for preparing a composite frozen confectionery product by combining the product of claim 1 with an ice confection which comprises:
   rapidly cooling a fluid chewy candy mass by first contacting the mass with an ice confection having a temperature of less than about –15° C. to form a combination; and
   conditioning the combination in a medium having a temperature of less than –15° C. until the chewy candy mass has undergone a glass transition.

7. A composite frozen product comprising the candy or sugar confectionery analogue according to claim 1; and a food item.

8. The product of claim 7, wherein the food item is an ice confection.

9. The product of claim 8, wherein the ice confection comprises at least one of ice cream, pudding, yogurt, popsicle, slush, or sorbet.

10. The product of claim 9, wherein the ice confection further comprises at least one of chocolate, flour-based products, or a plurality of fruit or nuts.

11. The product of claim 9, wherein the ice confection is disposed on a stick or in a push-up tube.

12. The product of claim 7, wherein the analogue comprises at least one ingredient of boiled sugar sweets, gums, jellies, licorice paste, cream paste, aerated confections, chewing gums, or marzipans.

13. The product of claim 7, wherein the chewy transition temperature is from about –12° C. to –3° C., and the equilibrium relative humidity is at least about 75%.

14. The product of claim 7, wherein the analogue is substantially free of crystalline structure.

15. The product of claim 7, wherein the analogue comprises at least one coloring agent.

16. The product of claim 7, wherein the analogue comprises at least one sugar, palm oil, and water.

17. A composite frozen product comprising a food item; and a chewy candy or sugar confectionery analogue which comprises at least one sugar, palm oil, and water, wherein the analogue has the following properties:
   an equilibrium relative humidity of at least about 70%; and
   a chewy transition temperature from about –15° C. to 0° C., such that the analogue is in a predominantly glassy state at normal cold storage and distribution temperatures for ice confectioneries but becomes chewy in the mouth when eaten cold, thus simulating the texture of corresponding chewy candy eaten at ambient temperature, wherein the at least one sugar comprises sucrose and corn syrup and the analogue further comprises mango pulp; pectin and citric acid.

18. The product of claim 17, wherein the total sugar is present in the analogue in an amount of about 60 to 90 parts, and the palm oil is present in the analogue in an amount of about 2 to 8 parts.

19. The product of claim 17, wherein the mango pulp is present in the analogue in an amount of about 5 to 15 parts, the pectin is present in the analogue in an amount of about 0.2 to 1.2 parts, and the citric acid is present in the analogue in an amount of about 0.05 to 0.7 parts.

20. The product of claim 19, wherein the food item is an ice confection comprising at least one of ice cream, pudding, yogurt, popsicle, slush, or sorbet, the chewy transition temperature of the analogue is from about –12° C. to –3° C., and the equilibrium relative humidity of the analogue is at least about 75%.

21. A composite frozen food product comprising:
   a chewy candy or sugar confectionery analogue having the following properties:
   an equilibrium relative humidity of at least about 70%; and
   a chewy transition temperature from about –15° C. to 0° C., such that the analogue is in a predominantly glassy state at normal cold storage and distribution temperatures for ice confectioneries but becomes chewy in the mouth when eaten cold, thus simulating the texture of corresponding chewy candy eaten at ambient temperature; and
   a frozen food product, wherein the frozen food product includes a coating of the chewy candy or sugar confectionery analogue.

* * * * *